United States Patent
Mansoorzare et al.

(10) Patent No.: US 11,811,237 B1
(45) Date of Patent: Nov. 7, 2023

(54) SYSTEM AND METHOD FOR RADIO FREQUENCY POWER SENSING AND SCAVENGING BASED ON PHONON-ELECTRON COUPLING IN ACOUSTIC WAVEGUIDES

(71) Applicant: University of Central Florida Research Foundation, Inc., Orlando, FL (US)

(72) Inventors: Hakhamanesh Mansoorzare, Orlando, FL (US); Reza Abdolvand, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/312,950

(22) Filed: May 5, 2023

Related U.S. Application Data

(60) Provisional application No. 63/358,647, filed on Jul. 6, 2022.

(51) Int. Cl.
  *H02J 50/00* (2016.01)
  *G01N 29/24* (2006.01)
  *H02J 50/20* (2016.01)

(52) U.S. Cl.
  CPC ........ *H02J 50/001* (2020.01); *G01N 29/2437* (2013.01); *H02J 50/20* (2016.02)

(58) Field of Classification Search
  CPC ..... H02J 50/001; H02J 50/20; G01N 29/2437
  See application file for complete search history.

(56) References Cited

U.S. PATENT DOCUMENTS

| | | |
|---|---|---|
| 9,590,587 B1 | 3/2017 | Thalmayr et al. |
| 2009/0289526 A1 | 11/2009 | Sinha et al. |
| 2016/0099704 A1 | 4/2016 | Jaakkola et al. |
| 2018/0287587 A1 | 10/2018 | Campanella Pineda et al. |
| 2018/0316333 A1 | 11/2018 | Nakamura et al. |
| 2019/0181828 A1 | 6/2019 | Iwamoto |
| 2021/0018467 A1 | 1/2021 | Abdolvand et al. |
| 2023/0138255 A1* | 5/2023 | Pudota .................... A01H 5/10 800/298 |

FOREIGN PATENT DOCUMENTS

JP    2022166348 A    * 11/2022

OTHER PUBLICATIONS

M.A Rosli et al. "Design of RF to DC conversion circuit for energy harvesting in CMOS 0.13-µm technology" Dec. 2018. pp. 1-9, Arau, Perlis, Malaysia.

(Continued)

*Primary Examiner* — Quan Tra
(74) *Attorney, Agent, or Firm* — Molly L. Sauter; Smith & Hopen, P.A.

(57) ABSTRACT

A system and method for converting a radio frequency (RF) to a direct current (DC) signal by generating acoustic phonons from the received RF signal utilizing a piezoelectric material. The acoustic phonons of the RF signal interact with the electrons of a semiconductive material to generate a DC signal that is proportional to the power of the RF signal. The DC signal can be used to power devices or can be interpreted as a measure of a local RF frequency spectrum.

20 Claims, 13 Drawing Sheets

(56) References Cited

OTHER PUBLICATIONS

E-Giang Tran et al. "RF power harvesting: a review on designing methodologies and applications" Micro and Nano Syst Letter. 2017 pp. 1-16. Open Access.

M. I. Mohamed et al. "Power Harvesting for Smart Sensor Networks in Monitoring Water Distribution System" Apr. 2011. pp. 393-398. Netherlands.

Md Rabiul Awal et al. Power Harvesting Using Dual Transformations of Piezoelectricity and Magnetism: A Review.2015 pp. 527-532, Student Conference on Research and Development.

\* cited by examiner

Top View:

US 11,811,237 B1

SYSTEM AND METHOD FOR RADIO FREQUENCY POWER SENSING AND SCAVENGING BASED ON PHONON-ELECTRON COUPLING IN ACOUSTIC WAVEGUIDES

CROSS-REFERENCE TO RELATED APPLICATIONS

This application claims priority to currently U.S. Provisional Patent Application No. 63/358,647 filed on Jul. 6, 2022 and entitled "Radio Frequency Power Sensing and Scavenging Based on Phonon-Electron Coupling in Acoustic Waveguides", the entirety of which is incorporated herein by reference.

FEDERALLY SPONSORED RESEARCH OR DEVELOPMENT

This invention was made with government support under Award No. 2122670 awarded by the National Science Foundation (NSF). The government has certain rights in the invention.

BACKGROUND OF THE INVENTION

Wireless communication terminals, including but not limited to, cellular telephones, base-stations and smart devices, must monitor the amount of signal power they transmit and receive both for regulation purposes and for maintaining transceiver performance. Additionally, the increasing scarcity of the frequency spectrum, resulting from an increase in connectivity and data, call for compact and low power schemes for radio frequency (RF) power sensing with the goal of more efficient utilization.

Typically RF power sensing modules are integrated within the transmit/receive chain of the wireless radio of the communication terminals. Conventionally, these power sensing modules are fabricated of diodes and multiple amplifier stages with power budgets that are prohibitively large for ultra-low power applications. In more extreme cases, such as wakeup radios, the transceiver must be virtually off until receiving a specific signal.

Accordingly, what is needed in the art is an RF power detection module that is effective in ultra-low power applications. However, in view of the art considered as a whole at the time the present invention was made, it was not obvious to those of ordinary skill in the field of this invention how an RF power detection module could be designed and implemented for use in ultra-low power applications.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

In various embodiments, the present invention provides a system and method for converting a radio frequency (RF) to a direct current (DC) signal by generating acoustic phonons from the received RF signal utilizing a piezoelectric material. The acoustic phonons of the RF signal interact with the charge carriers (e.g., electrons) of a semiconductive material to generate a DC signal that is proportional to the power of the RF signal. The DC signal can be used to power devices or can be interpreted as a measure of a local RF frequency spectrum.

In one embodiment, an acoustoelectric RF-to-DC converter is provided. The RF-to-DC converter incudes an input port for receiving a radio frequency (RF) signal and an acoustic waveguide coupled to the input port, the acoustic waveguide comprising a piezoelectric layer and a semiconductor layer adjacent to the piezoelectric layer, wherein the piezoelectric transduces the RF signal into an acoustic signal and the acoustic signal interacts with the semiconductor layer to generate a direct current (DC) signal that is proportional to a power of the RF signal.

In particular, the input port of the RF-to-DC converter includes at least one RF input port electrode and the configuration of the at least one RF input port electrode determines a desired frequency range for the RF-to-DC conversion.

In a specific embodiment, a periodicity of the at least one RF input port electrode determines a center frequency for the RF-to-DC conversion. In another embodiment, a number of fingers of the at least one RF input port electrode determines a frequency bandwidth for the RF-to-DC conversion. In an additional embodiment, an angle of a plurality of fingers of the at least one RF input port electrode determines a frequency bandwidth for the RF-to-DC conversion.

In another embodiment, a method for converting an RF signal to a DC signal is provided. The method includes, receiving an RF signal at an input port of an acoustic waveguide, wherein the acoustic waveguide comprises a piezoelectric layer and a semiconductor layer adjacent to the piezoelectric layer, transducing the RF signal into an acoustic signal at the piezoelectric layer and allowing the acoustic signal to interact with the semiconductor layer to generate a DC signal that is proportional to a power of the RF signal.

The method may further include, providing the DC signal to a wireless device to power the wireless device or using the DC signal to sense a frequency spectrum surrounding a wireless device.

In a particular embodiment, a method for performing spectrum sensing is provided. The method includes, receiving an RF signal at an input port of each acoustic waveguide of an array of acoustic waveguides, wherein each acoustic waveguide of the array of acoustic waveguides comprises a piezoelectric layer, a semiconductor layer adjacent to the piezoelectric layer and an RF input port electrode and wherein the RF input port electrode of each of the acoustic waveguides of the array of acoustic waveguides is configured to be sensitive to a different RF frequency. The method further includes, transducing the RF signal received at each of the acoustic waveguides into an acoustic signal at the piezoelectric layer of the respective acoustic waveguide, allowing the acoustic signal to interact with the semiconductor layer of the respective acoustic waveguide to generate a DC signal that is proportional to a power of the RF signal and performing spectrum sensing based upon the DC signals generated by each of the acoustic waveguides of the array of acoustic waveguides.

As such, in various embodiments, the present invention provides an RF power detection module that is effective in ultra-low power applications.

DETAILED DESCRIPTION OF THE INVENTION

Figure 1A:
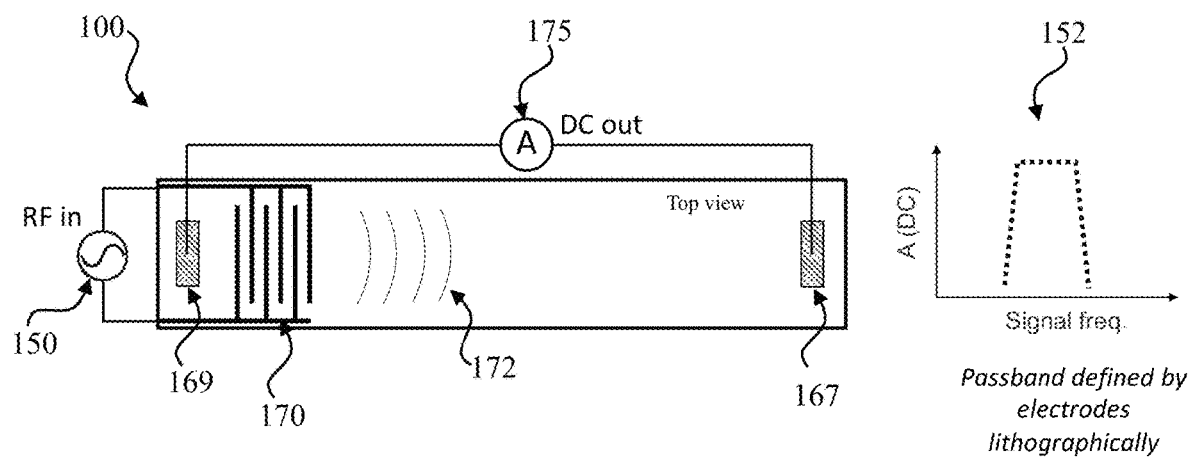
FIG. 1A illustrates a top-down view of a conceptual schematic of an embodiment of an acoustoelectric RF-to-DC converter, in accordance with an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention. The invention accordingly comprises the features of construction, combination of elements, and arrangement of parts that will be exemplified in the disclosure set forth hereinafter and the scope of the invention will be indicated in the claims.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The rapid increase in the amount of data and connected nodes in wireless communication systems is causing congestion and scarcity of the radio frequency (RF) spectrum used for wireless communications. Such interferences are the result of an increased number of basestations, mobile terminals, such as the transmitting unit itself or neighboring devices, and smart-devices which form the internet-of-things (IoT). As a result of these interferences, precise monitoring and efficient allocation of frequency bands is becoming more and more critical. This calls for the integration of power/spectrum sensing capabilities into wireless terminals to detect the amount of energy in targeted frequency bands and to regulate the transmitting power and gain of the receive chain. Conventionally, the RF power sensing is realized using diodes and multiple gain stages to convert a targeted RF signal into a DC signal for interpretation. However, this conversion undesirably adds to the power budget and the complexity of the system.

Additionally, IoT nodes are currently facing limitations in terms of available energy for operation and frequency spectrum for communication. The energy for the IoT nodes is provided by batteries that are unable to allow for sustainable expansion of the IoT, therefore there is the need for harvesting ambient energy, such as thermal, vibrational or RF elecromagnetic waves. RF electromagnetic wave are the most ubiquitous form since it is the means of communication among IoT nodes and hubs. The limited spectrum, on the other hand, calls for more intelligent data transmission between the IoT nodes and hubs, which require that the IoT understand the frequency occupancy in its vicinity. While both of these limitations are currently addressed using diodes and transistors, these solutions either have a limited detection threshold or non-zero power consumption.

In contrast with other solutions known in the art, the RF-to-DC converter of the present invention provides a completely passive chip-scale scheme for converting the RF signal into DC that can be used for powering a wireless node (e.g., IoT sensor) or mapping the surrounding frequency occupancy for avoiding interference with other signals or quantifying the amount of RF signal power.

In the various embodiments of the present invention, a novel approach is disclosed that leverages the strong energy coupling between acoustic phonons, which are piezoelectrically generated by the targeted RF signal, and electrons (or holes) in an engineered acoustic waveguide made of piezoelectric-semiconductor materials. Using a strong piezoelectric material, including, but not limited to, lithium niobate, III-V compounds such as aluminum nitride, lead zirconate titanate (PZT), and lead magnesium niobate-lead titanate (PMN-PT), ensures that the RF signal is efficiently transduced into the acoustic (mechanical) domain, thereby generating traveling acoustic waves which interact with electrons (assuming n-type semiconductor) within the waveguide, thus generating a DC signal that is proportional to the power of the original signal.

$I \propto \mu A \alpha / v$ The conversion from AC radio frequency signal into DC signal (I) depends on the acoustic wave amplitude (A), phonon-electron loss ($\alpha$), and the ratio of the electron mobility ($\mu$) to acoustic wave velocity (v) and can be modeled by $I \propto \mu A \alpha / v$. The phonon-electron loss is mainly determined by the piezoelectric coupling, and the effective capacitance and resistance of the waveguide. Since the conversion efficiency is proportional to the piezoelectric coupling and more specifically the effective electromechanical coupling, acoustic waves and piezoelectric materials with high electromechanical coupling are desired. Acoustic waves confined in thin plates or fins (such as Lamb waves, shear horizontal waves, etc.) or in thin films mounted on low acoustic leakage substrates can increase coupling. Techniques such as doping the piezoelectric material, or using periodically poled piezoelectric films can also increase the coupling. The latter could improve performance at higher frequencies as well. The electron mobility and transport can be enhanced by incorporating gate electrode structures adjacent to or in contact with the acoustic waveguide or passivation layers in between the piezoelectric layer and semiconductor layer. The waveguide can be formed by etching its boundary (so that it is terminated to air or vacuum) or by confining the acoustic waves in a desired region for example by acoustic dispersion engineering, creating acoustic impedance mismatch, or other common techniques used for acoustic wave confinement or localization.

The passband of the waveguide can be defined by one or more dimension of the waveguide or the material deposited on top of the waveguide. For example, metal electrodes forming interdigital transducers (IDT) can be patterned to target different frequency bands lithographically. As such, an array of these waveguides, each having its unique passband, can directly map the occupancy of multiple frequency bands of interest into DC signals in a passive manner, thus providing a tool for improved frequency spectrum occupancy awareness and subsequent spectrum utilization. The generated DC signal can be further used to provide power to a subsequent stage such as a sensor, actuator, or integrated circuit (IC). As such, this scheme also enables zero power wakeup receivers that scavenge energy from RF signals received by an antenna. This is especially critical as it is projected that the limited battery life is currently hindering the sustainable expansion of the internet-of-things.

Ultra low power transceivers should ideally spend their limited power budget entirely for amplification of the transmit/receive signal. However, currently part of this limited power budget is spent on sensing the transmit/receive signal or occupancy of available frequency bands. Having a completely passive module for the RF sensing purpose, as is proposed by the present invention, would benefit ultra low power transceivers by eliminating the need for power-hungry RF sensing modules. Additionally, wakeup radios, which must remain dormant, and ideally consume zero power before being summoned, could be built with this truly zero power RF-to-DC conversion scheme and scavenge energy from the RF power radiated by nearby modules. Furthermore the radiated RF power, otherwise wasted, could be scavenged by this module and stored in a capacitor or a battery.

Non-limiting proof-of-concept devices developed in accordance with the present invention could demonstrate more than 40 dB sensitivity range for the RF-to-DC conversion and more than 10 V DC voltage, for example, by a 10 dBm RF signal received by a ~700 MHz waveguide, which can be further improved by design optimizations. The bandpass frequency of the waveguide can range from 10's of MHz to several GHz and its fractional bandwidth can range from less than 0.1 percent to more than 10s of percent.

Figure 1B:
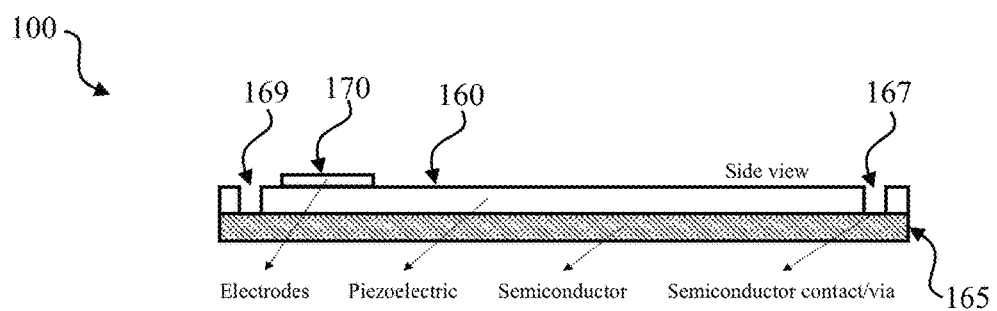
FIG. 1B illustrates a side view of a conceptual schematic of an embodiment of an acoustoelectric RF-to-DC converter, in accordance with an embodiment of the present invention.

A conceptual schematic of an embodiment of an acoustoelectric RF-to-DC converter in accordance with the present invention is shown in FIG. 1A and FIG. 1B. The main components of the RF-to-DC converter 100 in accordance with the present invention are illustrated in FIG. 1A from top-down perspective and in FIG. 1B from a side perspective.

In the embodiment illustrated in FIG. 1A and FIG. 1B, an RF signal 150 is received at an input port of an acoustoelectric waveguide 100 comprising at least one input port electrode 170. The input port electrode 170 defines a passband 152 for the RF-to-DC conversion, as discussed in more detail below.

The acoustoelectric waveguide comprises a piezoelectric layer 160, a semiconductor layer 165 adjacent to the piezoelectric layer (shown in FIG. 1B) and at least two semiconductor contact/vias 167, 169. The RF signal is introduced to the piezoelectric layer of the acoustoelectric waveguide 100 and acoustic phonons are piezoelectrically generated from the RF signal 150 by the piezoelectric layer of the acoustic waveguide 100. The strong piezoelectric material 160 ensures that the RF signal 150 is efficiently transduced into the acoustic domain, thereby generating traveling acoustic waves 172 which interact with electrons in the semiconductor layer 165 (assuming n-type semiconductor) within the waveguide 100, thereby generating a DC signal 175 that is proportional to the power of the targeted RF signal 150. The DC signal 175 is measured across the semiconductor contact/vias 167, 169.

In various embodiments, the piezoelectric layer 160 may be comprised of one or more of lithium niobate, III-V compounds such as aluminum scandium nitride, lead zirconate titanate (PZT) and lead magnesium niobate-lead titanate (PMN-PT). The piezoelectric layer 160 may be pure or doped. In one embodiment, the piezoelectric layer 160 may be a periodically polarized piezoelectric film and in a particular embodiment the piezoelectric layer 160 may consist of a stack of multiple piezoelectric films having different poling orientations or the piezoelectric film can be a piezoelectric superlattice.

In various embodiments, the semiconductor layer 165 may be comprised of one or more of silicon, germanium, III-V compounds, and two-dimensional materials (e.g., graphene, MoS2, InSe). The semiconductor layer 165 may be lightly or moderately doped.

The piezoelectric layer 160 and the semiconductor layer 165 may be bonded together or alternatively, the layers 160, 165 may be deposited onto one another. In a particular embodiment, the piezoelectric layer 160 and the semiconductor layer 165 may be separated by a very thin (few to 10s of nanometer thick) passivation or dielectric layer.

A gate electrode structure may be positioned adjacent to the acoustic waveguide 100 to enable charge carrier modification in the semiconductor layer 165. In one embodiment, the acoustic waveguide 100 may have etched sidewalls. In an additional embodiment, the acoustic waveguide 100 may include acoustic wave confinement structures deposited on it.

Figure 2:
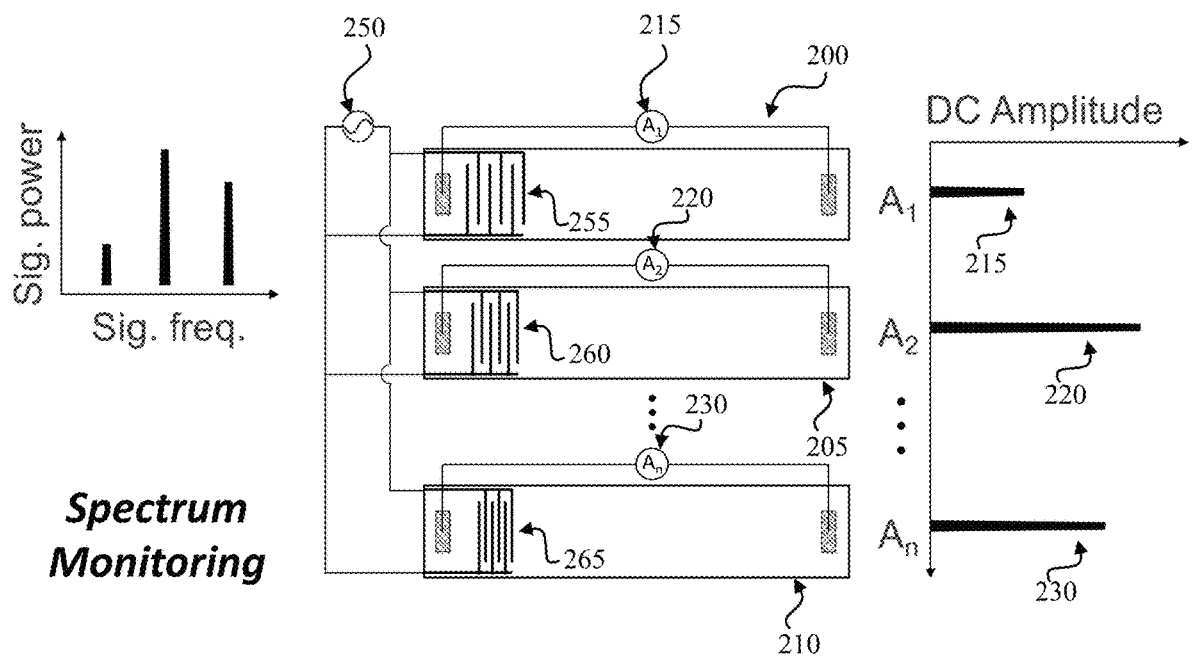
FIG. 2 illustrates a conceptual schematic of an array of acoustoelectric RF-to-DC converters for use in spectrum monitoring, in accordance with an embodiment of the present invention.

A first proposed application of the RF-to-DC converter for use in spectrum monitoring is illustrated in FIG. 2. As shown in FIG. 2, an RF signal 250 may be provided to a plurality of acoustoelectric RF-to-DC converters 200, 205, 210. In this embodiment, each of the RF input port electrodes 255, 260, 265 of the respective RF-to-DC converters 200, 205, 210 has a different periodicity of electrode fingers 255, 260, 265. As shown, the difference in the periodicity of the electrode fingers 255, 260, 265 corresponds with different DC signals with different amplitudes 215, 220, 230 after the RF-to-DC conversion. The resulting DC signals and their amplitudes 215, 220, 230 can be used to monitor the RF spectrum by identifying the power and frequency of the various RF signals.

Figure 3:
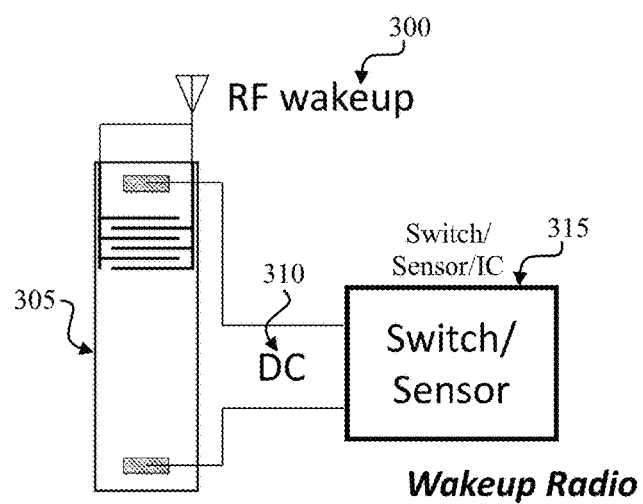
FIG. 3 illustrates a conceptual schematic of an acoustoelectric RF-to-DC converter for use in a wakeup radio, in accordance with an embodiment of the present invention.

A second proposed application of the RF-to-DC converter for use in a wakeup radio is illustrated in FIG. 3. As shown in FIG. 3, an RF wakeup signal 300 may be provided at an input to the acoustoelectric RF-to-DC converter 305. Following the conversion of the RF signal to a DC signal by the waveguide of the acoustoelectric RF-to-DC converter, the DC output 310 may be provided to a switch, sensor, actuator, or an integrated circuit 315 that can be used to wakeup a transceiver of a ultra low power or zero power device, such as an IoT device.

Figure 4:
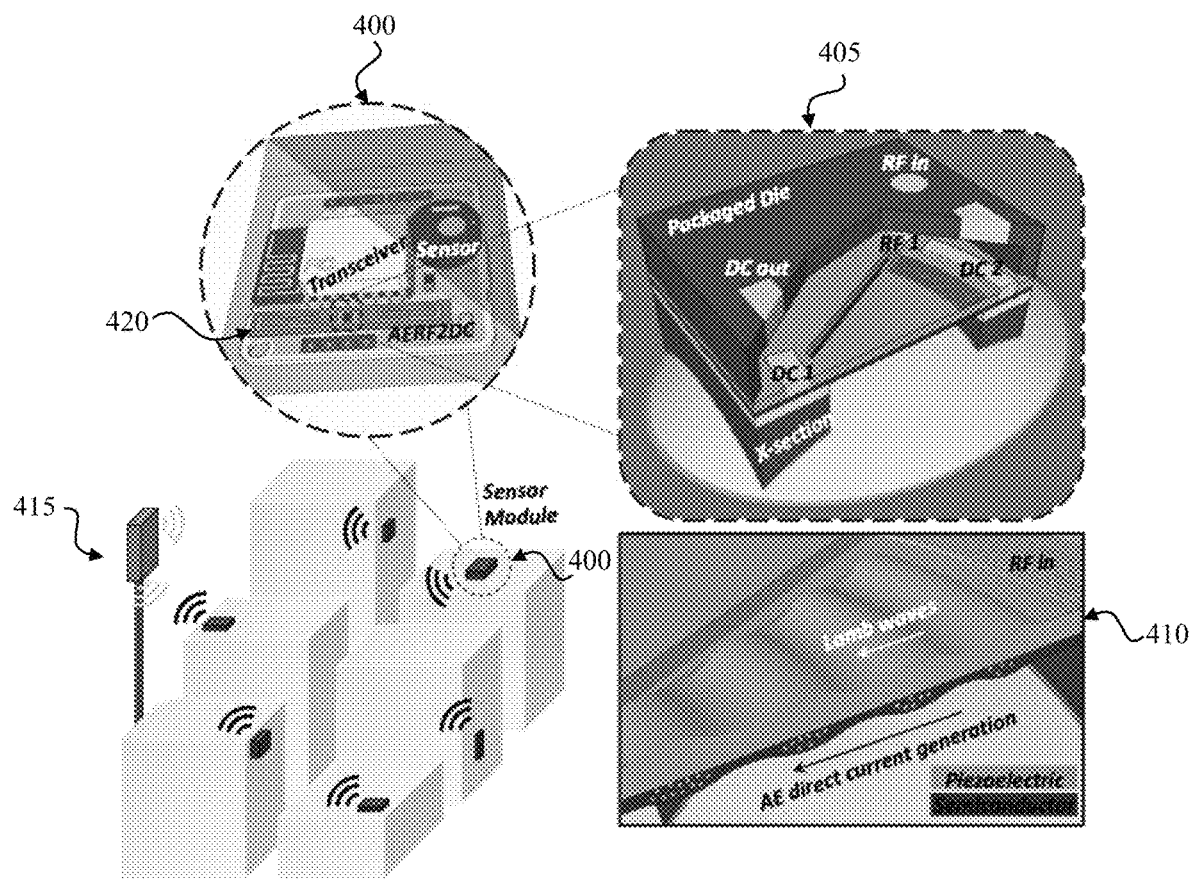
FIG. 4 illustrates an expanded views of an acoustoelectric RF-to-DC converter in a sensing environment, in accordance with an embodiment.

FIG. 4 illustrates a plurality of wireless sensor modules 400 comprising acoustoelectric RF-to-DC converters 405 for sensing RF signals transmitted by an antenna of a primary (interrogating) module nearby 415 and received by an antenna 420 of the sensor module. An expanded view of a exemplary sensor module 400 and an exemplary acoustoelectric RF-to-DC converter 405. An illustration 410 is also provided showing the waves of the acoustic signal (guided fundamental symmetric Lamb waves in this case) resulting from the RF signal in the waveguide of the RF-to-DC converter 405 also showing the generated electron flow in the semiconductor layer of the RF-to-DC converter 405. Focusing interdigital transducers are used in this embodiment for increasing wave intensity.

Figure 5:
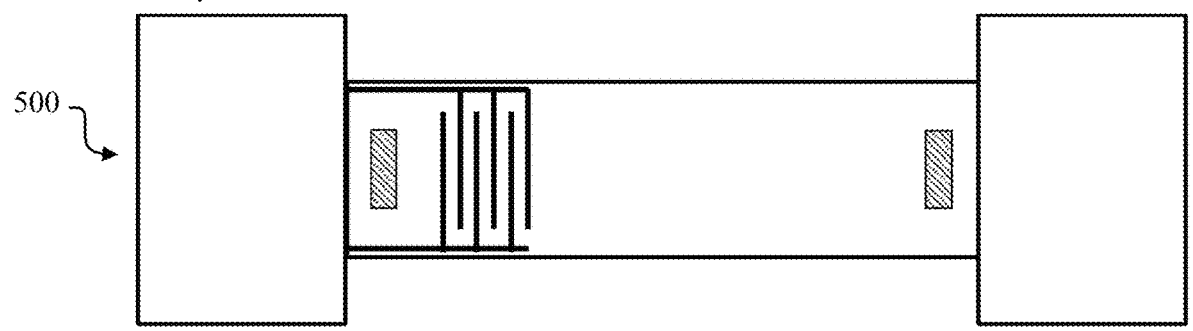
FIG. 5 illustrates a conceptual schematic of embodiments of acoustoelectric RF-to-DC converters in accordance with the present invention having two different configurations including a suspended waveguide and a solidly mounted waveguide.
Figure 5:
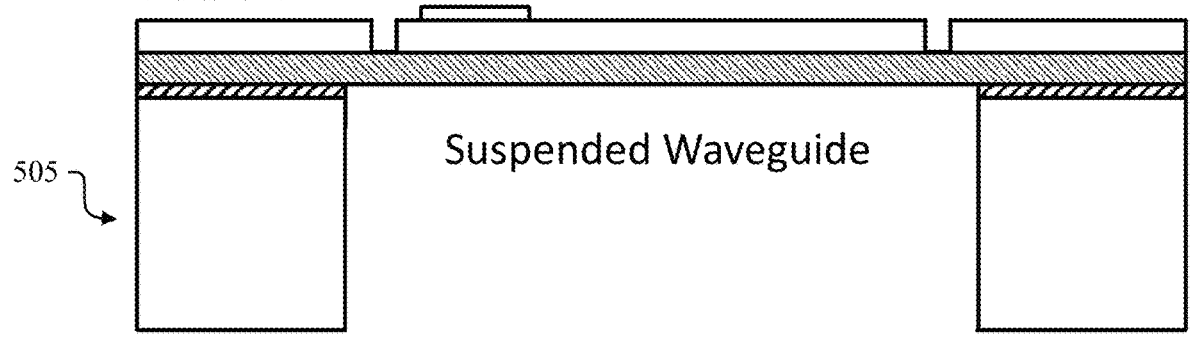
Figure 5:
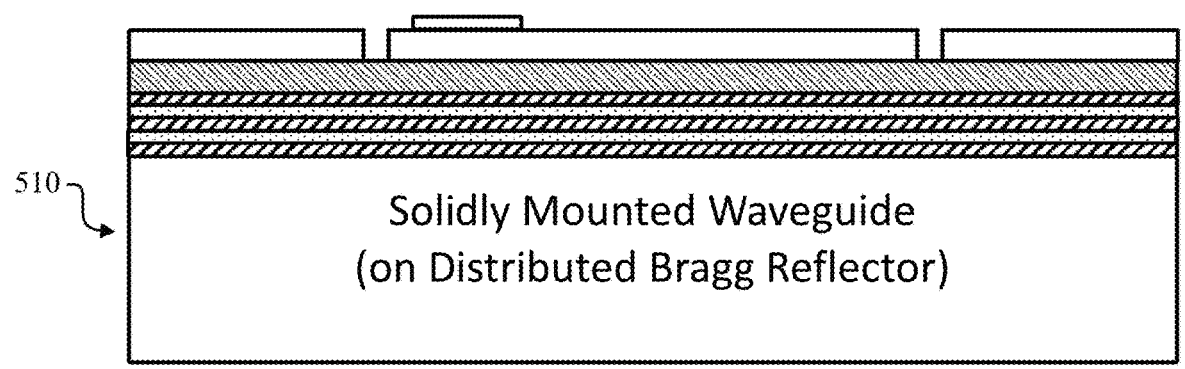

FIG. 5 illustrates two possible configurations of the acoustoelectric RF-to-DC converter of the present invention. A top-down view 500 of the acoustoelectric RF-to-DC converter is shown, as has been previously described. In a first configuration, a side-view of the acoustoelectric RF-to-DC converter is illustrated comprising a suspended waveguide 505. In a second configuration, a side-view of the acoustoelectric RF-to-DC converter is illustrated comprising a solidly mounted waveguide 510. Waveguides that are suspended and solidly mounted, such as ones mounted on a Distributed Bragg Reflector, are well known in the art.

Figure 6:
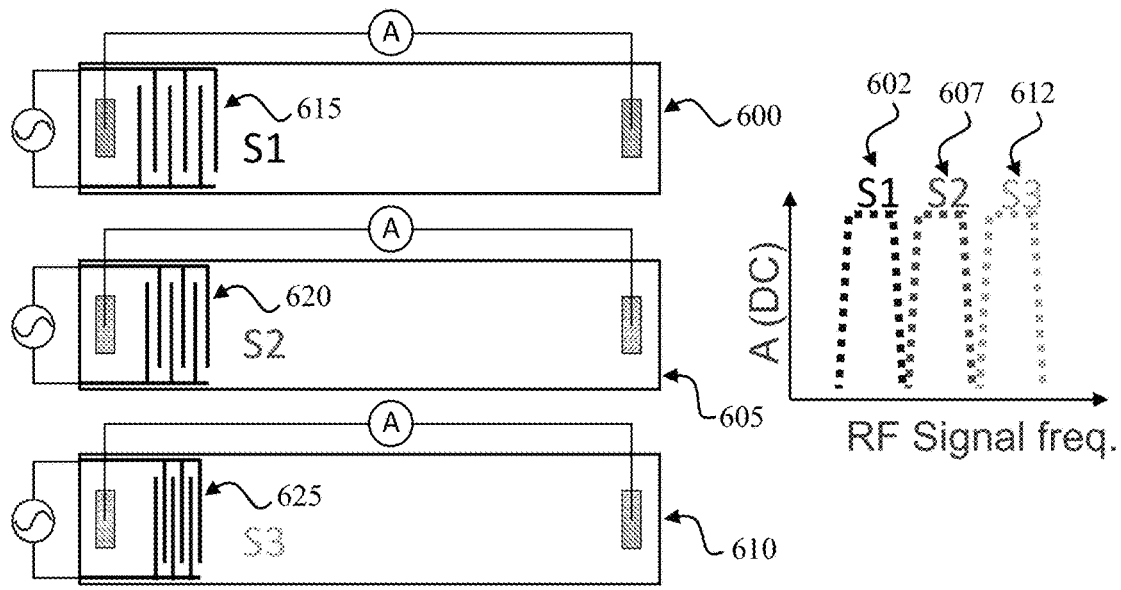
FIG. 6 illustrates a conceptual schematic of embodiments of acoustoelectric RF-to-DC converters in accordance with the present invention having three different configurations of RF input port electrodes with different periodicities which define the center frequency for RF-to-DC conversion.

In FIG. 6 a conceptual schematic of embodiments of three acoustoelectric RF-to-DC converters 600, 605, 610 in accordance with the present invention, each having a different RF input port electrode configuration 615, 620, 625 with different periodicities. The periodicity of the RF input port electrode defines the center frequency for the RF-to-DC conversion. The RF-to-DC converter 600 having the widest RF input port electrode periodicity 615, relative to the other RF-to-DC converters 605, 610, operates at the lowest frequency S1 602 while the RF-to-DC converter 610 having the shortest input port electrode periodicity 625, relative to the other RF-to-DC converters 600, 605, operates at the highest frequency S3 612. The RF-to-DC converter 605 having the input port electrode periodicity 620 between that of the other RF-to-DC converters 600, 610 operates at frequency S2 607, between S1 602 and S3 612. As such, the periodicity of the input port electrode can be used to define the center frequency for the acoustoelectric RF-to-DC converter of the present invention.

Figure 7:
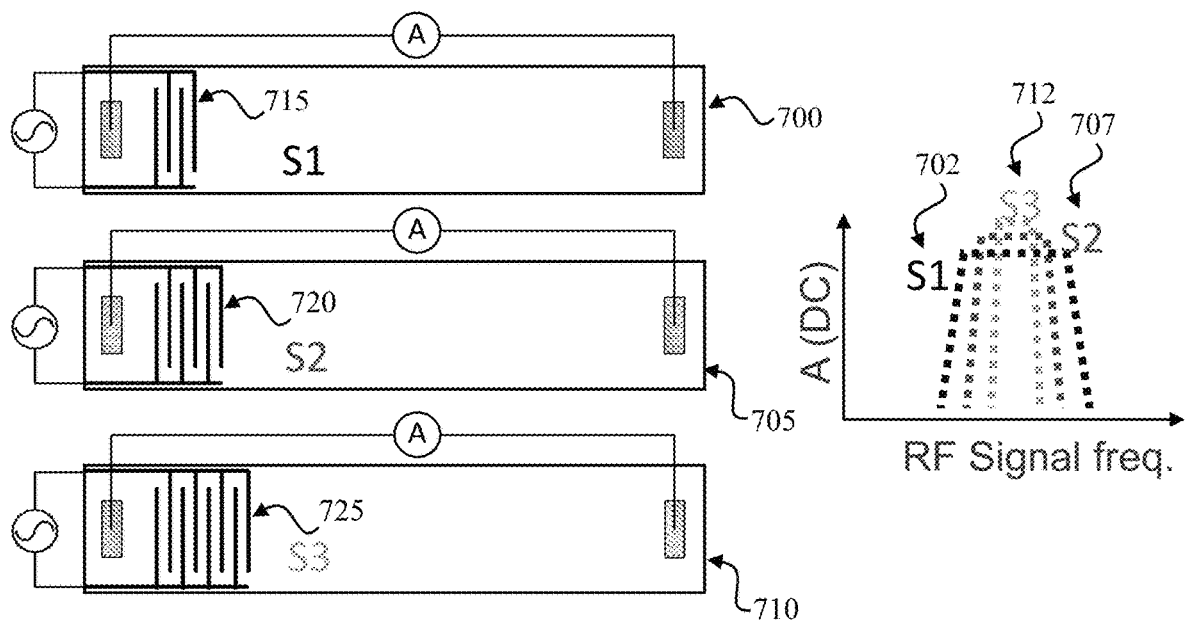
FIG. 7 illustrates a conceptual schematic of embodiments of acoustoelectric RF-to-DC converters in accordance with the present invention having three different configurations of RF input port electrodes with different number of fingers which define the bandwidth for RF-to-DC conversion.

In FIG. 7 a conceptual schematic of embodiments of three acoustoelectric RF-to-DC converters 700, 705, 710 in accordance with the present invention, each having a different RF input port electrode configuration 715, 720, 725 with a different number of fingers. The number of fingers of the input port electrode defines the bandwidth for the RF-to-DC conversion. The RF-to-DC converter 700 having the least number of fingers 715, relative to the other RF-to-DC converters 705, 710, operates within a wider frequency bandwidth S1 702 while the RF-to-DC converter 710 having the most number of fingers 725, relative to the other RF-to-DC converters 700, 705, operates within a narrower frequency bandwidth S3 712. The RF-to-DC converter 705 having a number of fingers 720 between that of the other RF-to-DC converters 700, 710 operates within a frequency bandwidth S2 707, between S1 702 and S3 712. As such, the number of fingers of the input port electrode can be used to define the frequency bandwidth for the acoustoelectric RF-to-DC converter of the present invention.

Figure 8:
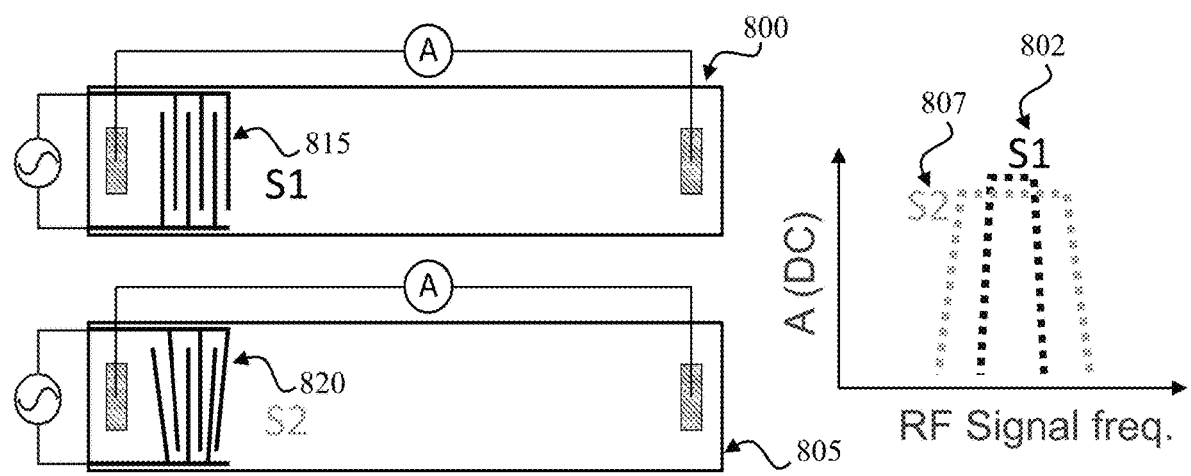
FIG. 8 illustrates a conceptual schematic of embodiments of acoustoelectric RF-to-DC converters in accordance with the present invention having two different configurations of RF input port electrodes with straight and slanted fingers which define the bandwidth for RF-to-DC conversion.

In FIG. 8 a conceptual schematic of embodiments of two acoustoelectric RF-to-DC converters 800, 805 in accordance with the present invention, each having a different RF input port electrode configuration 815, 820. The RF input port electrode configuration 815 of a first acoustoelectric RF-to-DC converter 800 comprises straight fingers and the RF input port electrode configuration 820 of a second acoustoelectric RF-to-DC converter 805 comprises slanted fingers. The fingers of the RF input port electrode being straight or slanted affects the bandwidth of the RF-to-DC conversion. The acoustoelectric RF-to-DC converter 800 having the straight fingers 815 operates within a narrower frequency bandwidth S1 802 compared to the frequency bandwidth S2 807 of the acoustoelectric RF-to-DC converter 805 having slanted fingers 820. As such, the angle of the fingers of the input port electrode can be used to define the frequency bandwidth for the acoustoelectric RF-to-DC converter of the present invention.

Figure 9:
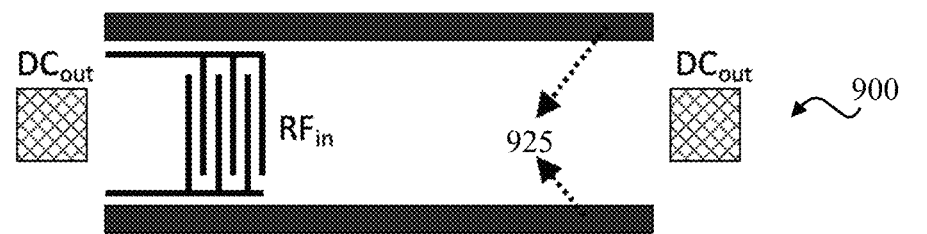
FIG. 9 illustrates a top-down view of conceptual schematic of embodiments of acoustoelectric RF-to-DC converters in accordance with the present invention having four different configurations of acoustic waveguiding.
Figure 9:
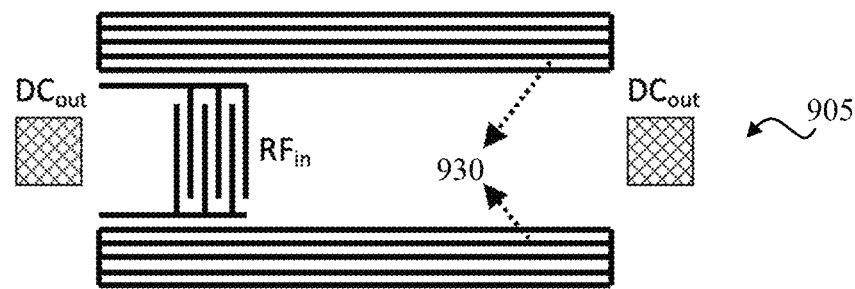
Figure 9:
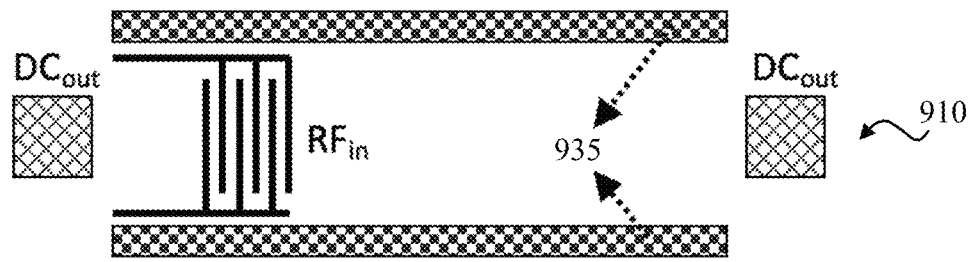
Figure 9:
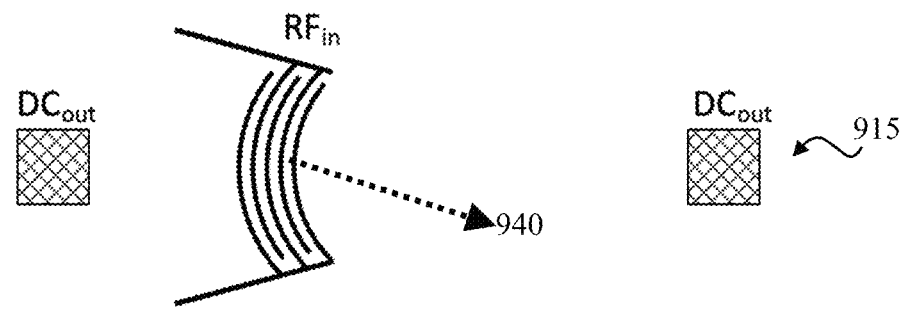
Figure 9:
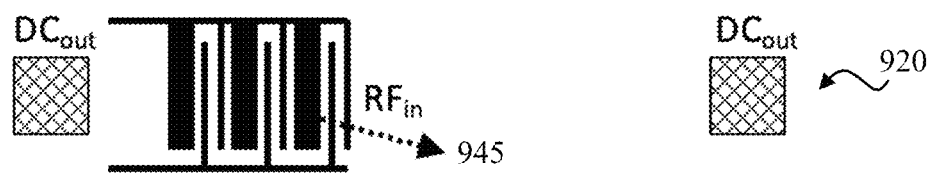

In FIG. 9 illustrates a top-down view of conceptual schematic of embodiments of five acoustoelectric RF-to-DC converters 900, 905, 910, 915, 920 in accordance with the present invention, each using a different technique for guiding the acoustic waves 925, 930, 935, 940, 945. The RF-to-DC converter 900 has etched side walls 925 for confining the acoustic waves within the waveguide. The RF-to-DC converter 905 has stripline reflectors 930 (such as deposited and patterned metal layer) for confining the acoustic waves within the intended waveguide region. The RF-to-DC converter 910 has a deposited film section 935 to shift the cutoff frequency of the acoustic waves or the impedance seen by the acoustic waves outside of the active waveguide region so that the acoustic waves are trapped within the intended (active) waveguide region. The RF-to-DC converter 915 has focusing type interdigital transducers 940 to focus the acoustic waves within the intended regions. The RF-to-DC converter 920 has uni-directional type interdigital transducers 945 to generate the acoustic waves in a single direction only.

Figure 10:
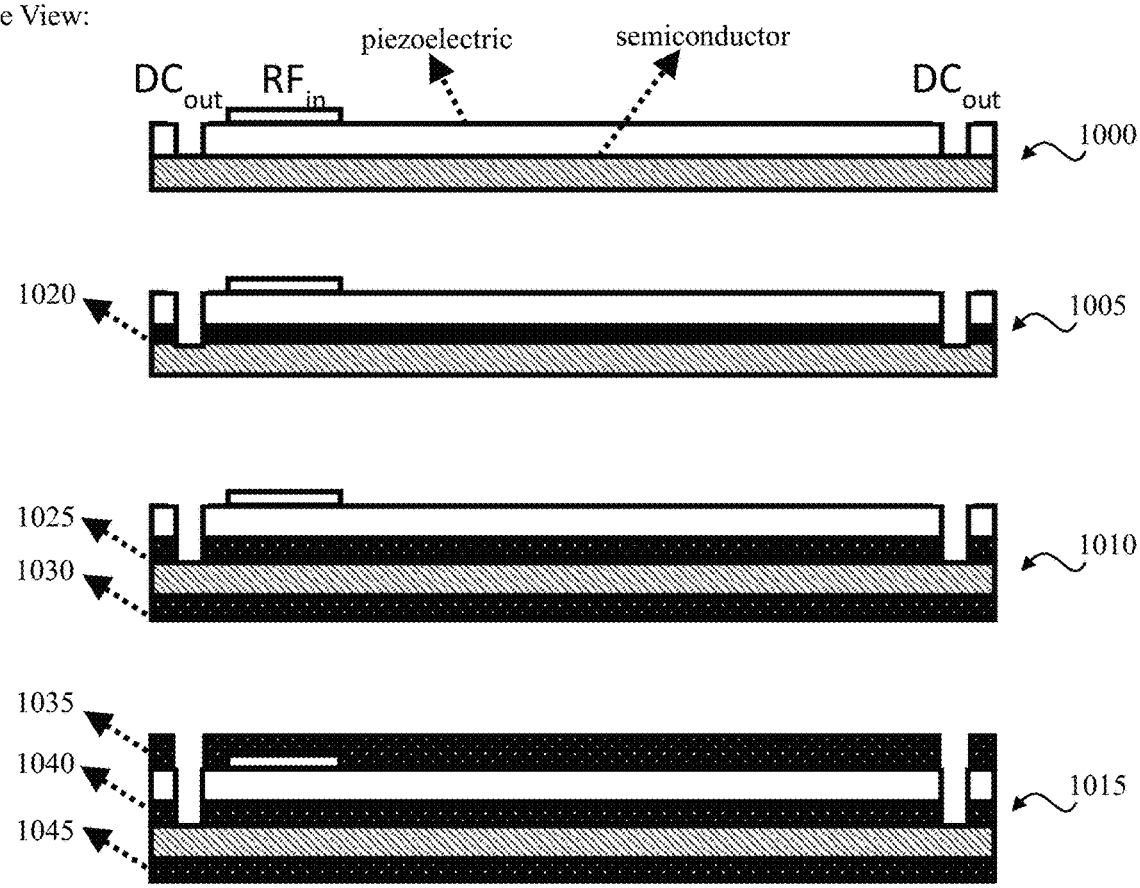
FIG. 10 illustrates a side view of conceptual schematic of embodiments of acoustoelectric RF-to-DC converters in accordance with the present invention having different configurations of passivation layers.

In FIG. 10 illustrates a side view of conceptual schematic of embodiments of four acoustoelectric RF-to-DC converters 1000, 1005, 1010, 1015 in accordance with the present invention, each having a different configuration of passivation layers is shown. The RF-to-DC converter 1000 does not have any passivation layers. The RF-to-DC converter 1005 has an acoustically-thin passivation layer 1020 between the piezoelectric layer and the semiconductor layer. The RF-to-DC converter 1010 has two acoustically-thin passivation layers 1025, 1030 sandwitching the semiconductor layer. The RF-to-DC converter 1015 has an acoustically-thin passivation layer 1035 on top of the piezoelectric layer, an acoustically-thin passivation layer 1040 between the piezoelectric layer and the semiconductor layer, and an acoustically-thin passivation layer 1045 underneath the semiconductor layer.

Figure 11:
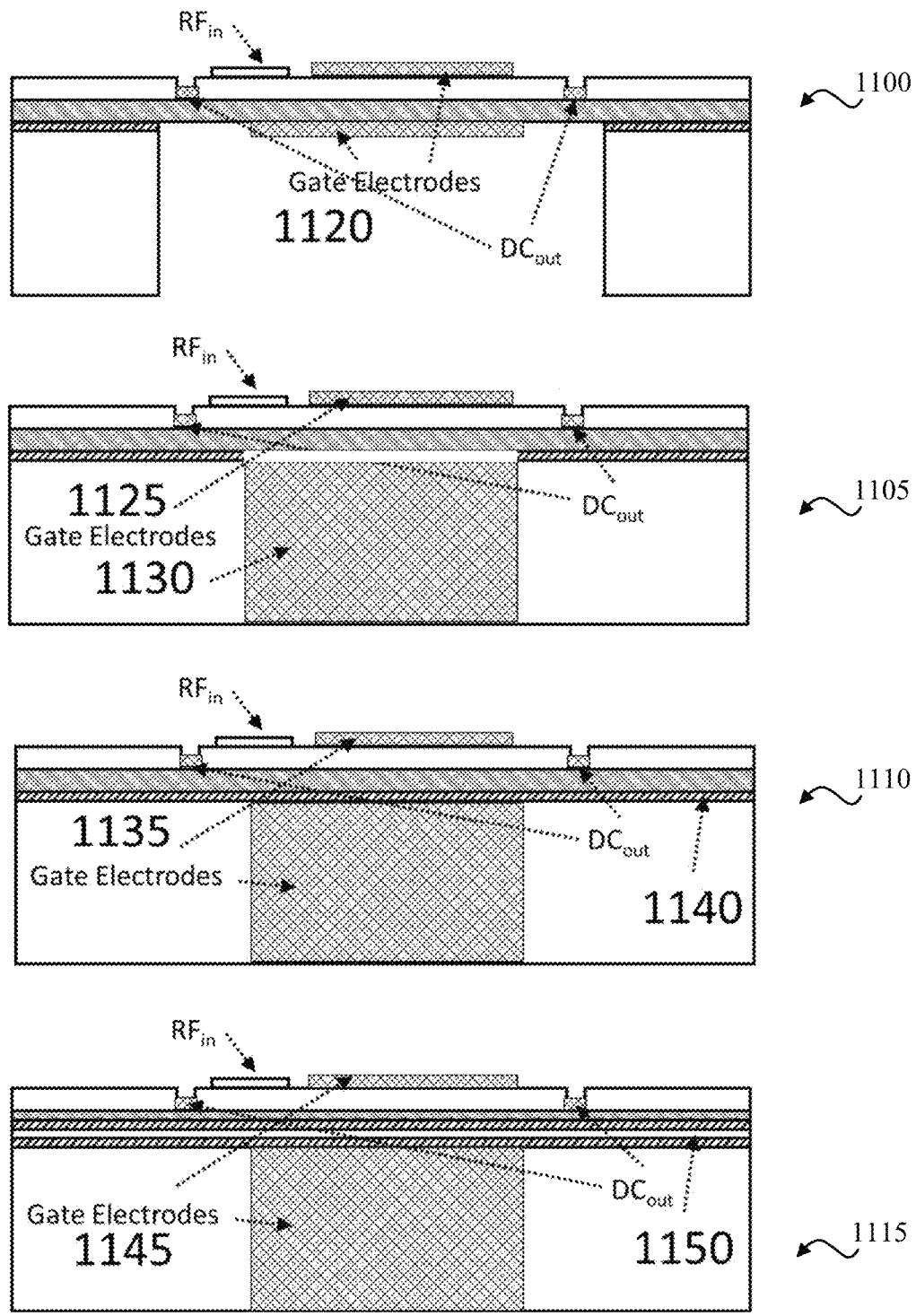
FIG. 11 illustrates a side view of conceptual schematic of embodiments of acoustoelectric RF-to-DC converters in accordance with the present invention having different configurations of gate electrodes.

In FIG. 11 illustrates a side view of conceptual schematic of embodiments of four acoustoelectric RF-to-DC converters 1100, 1105, 1110, 1115 in accordance with the present invention, each having a different configuration of gate electrodes is shown. The RF-to-DC converter 1100 has gate electrodes 1120 on one or both sides of the suspended waveguide (directly deposited on the waveguide or held adjacent to it with a small gap) in order to change a property of charge carriers in the semiconductor layer. The RF-to-DC converter 1105 has gate electrodes 1125 on top and 1130 at the bottom of the suspended waveguide where a doped handle wafer layer forms the bottom gate electrode 1130. The RF-to-DC converters 1110, 1115 have gate electrodes 1135, 1145 similar to the RF-to-DC converter 1105 but the waveguide is solidly mounted on a dielectric layer 1140 or distributed Bragg reflector layer 1150.

Figure 12:
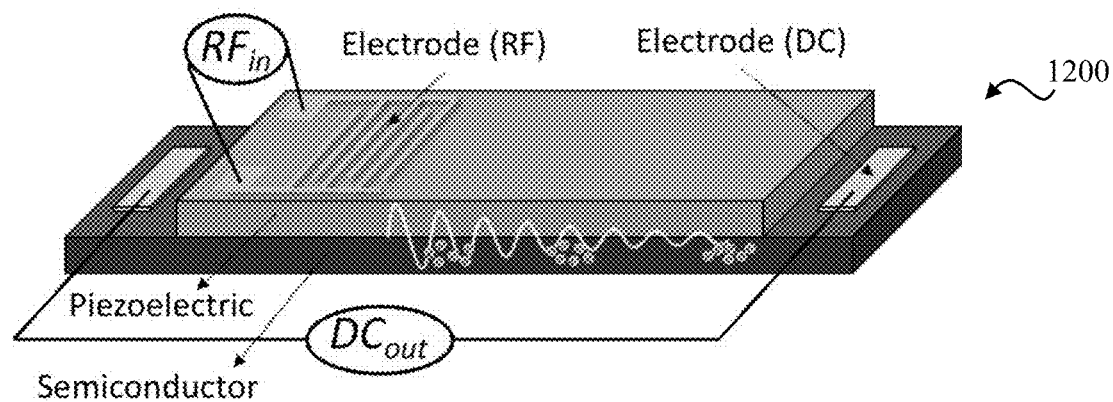
FIG. 12 illustrates a 3D view of conceptual schematic of one embodiment of acoustoelectric RF-to-DC converter in accordance with the present invention and a possible RF-to-DC conversion behavior.
Figure 12:
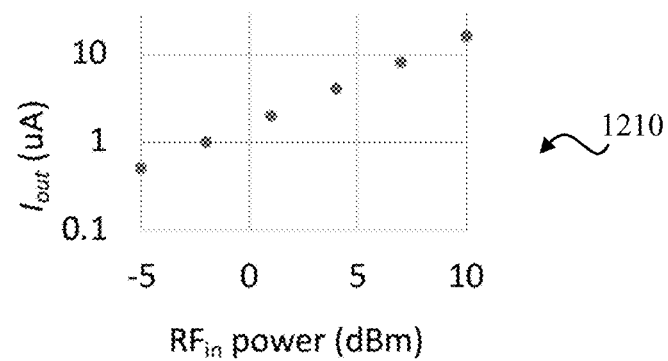

In FIG. 12 illustrates a 3D view of conceptual schematic of one embodiment of acoustoelectric RF-to-DC converter 1200 in accordance with the present invention is shown. A possible RF-to-DC conversion behavior translating the input RF amplitude to output DC amplitude can be seen from the plot 1210.

Figure 13:
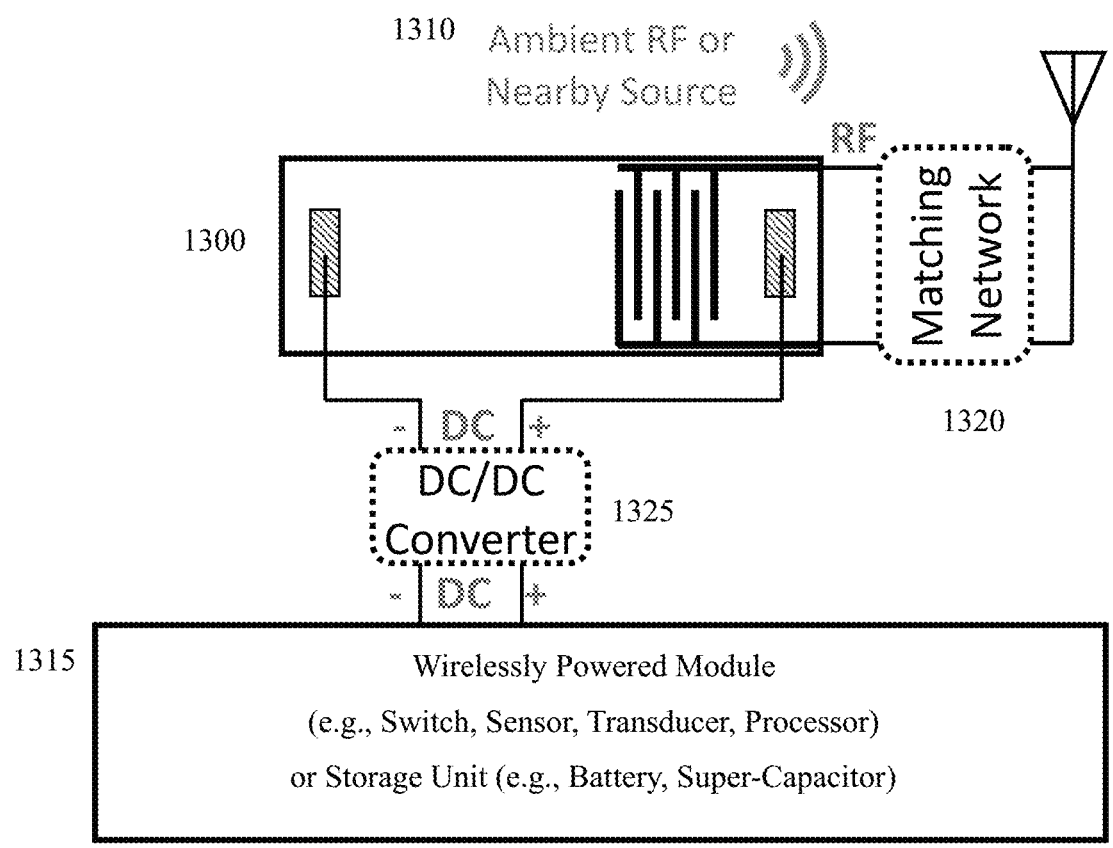
FIG. 13 illustrates few applications for the acoustoelectric RF-to-DC converter in accordance with the present invention.

In FIG. 13 illustrates a few of the applications for the acoustoelectric RF-to-DC converter 1300 in accordance with the present invention is shown. An RF energy 1310 present in the ambient or emitted from a nearby RF source can be used by the acoustoelectric RF-to-DC converter 1300 to generate a DC signal that is fed to a subsequent stage 1315. The subsequent stage can include one or more of a wirelessly powered or battery powered module such as a switch, a relay, a transistor, a sensor, a transducer, an actuator, an integrated circuit, or a microprocessor as well as a DC storage unit such as a battery or a super-capacitor. Additionally, a matching network 1320 prior to the acoustoelectric RF-to-DC converter 1300 and a DC/DC converter 1325 after the acoustoelectric RF-to-DC converter 1300 can be used for signal conditioning.

Figure 14:
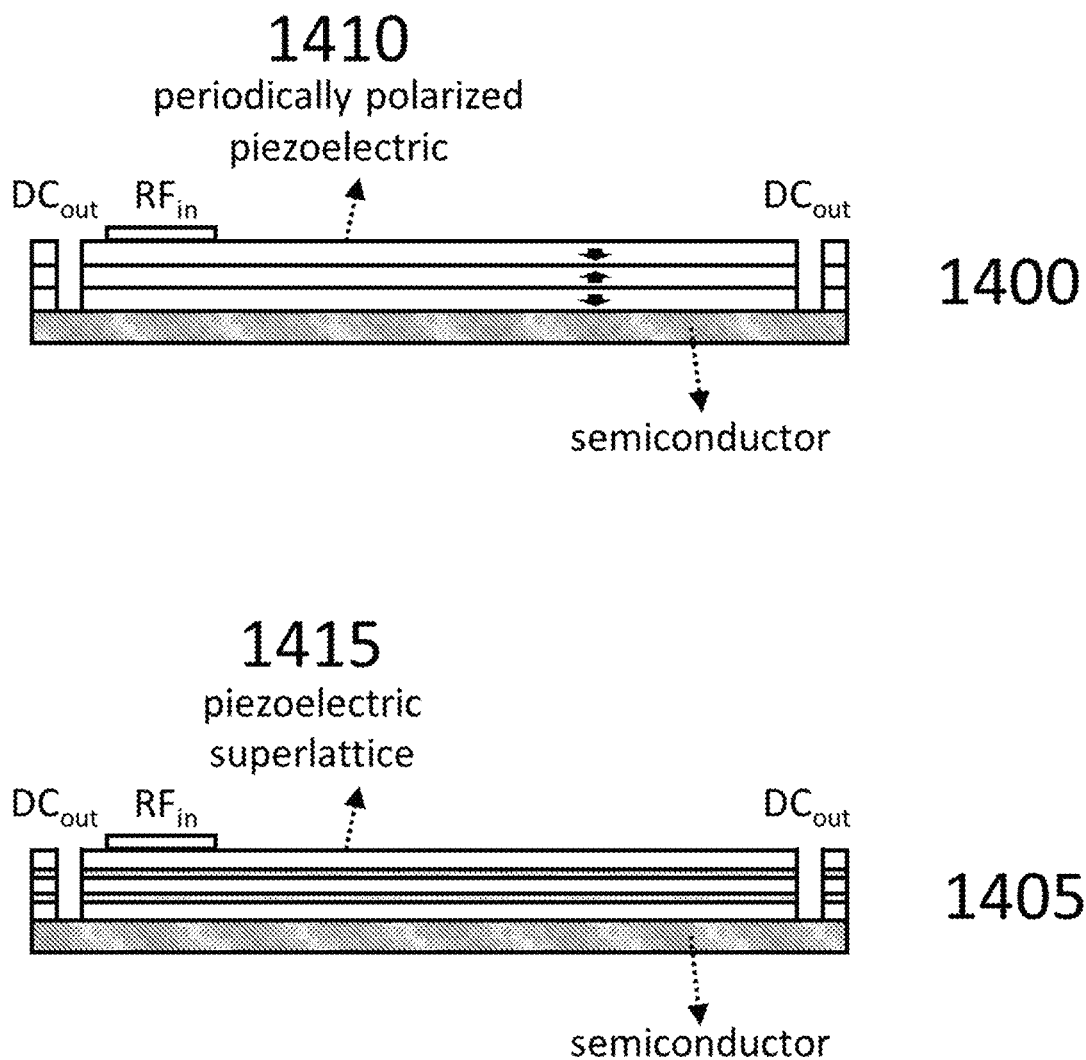
FIG. 14 illustrates a side view of conceptual schematic of embodiments of acoustoelectric RF-to-DC converters in accordance with the present invention having different configurations of piezoelectric layer.

In FIG. 14 a side view of conceptual schematic of embodiments of two acoustoelectric RF-to-DC converters 1400, 1405 in accordance with the present invention, each having a different configuration of piezoelectric layer is shown. The RF-to-DC converter 1400 has periodically poled piezoelectric layer 1410 that for example could improve the electromechanical coupling of higher order acoustic waves. The RF-to-DC converter 1405 has a piezoelectric superlattice 1415 as the piezoelectric layer which for example could improve a piezoelectric film quality.

Figure 15:
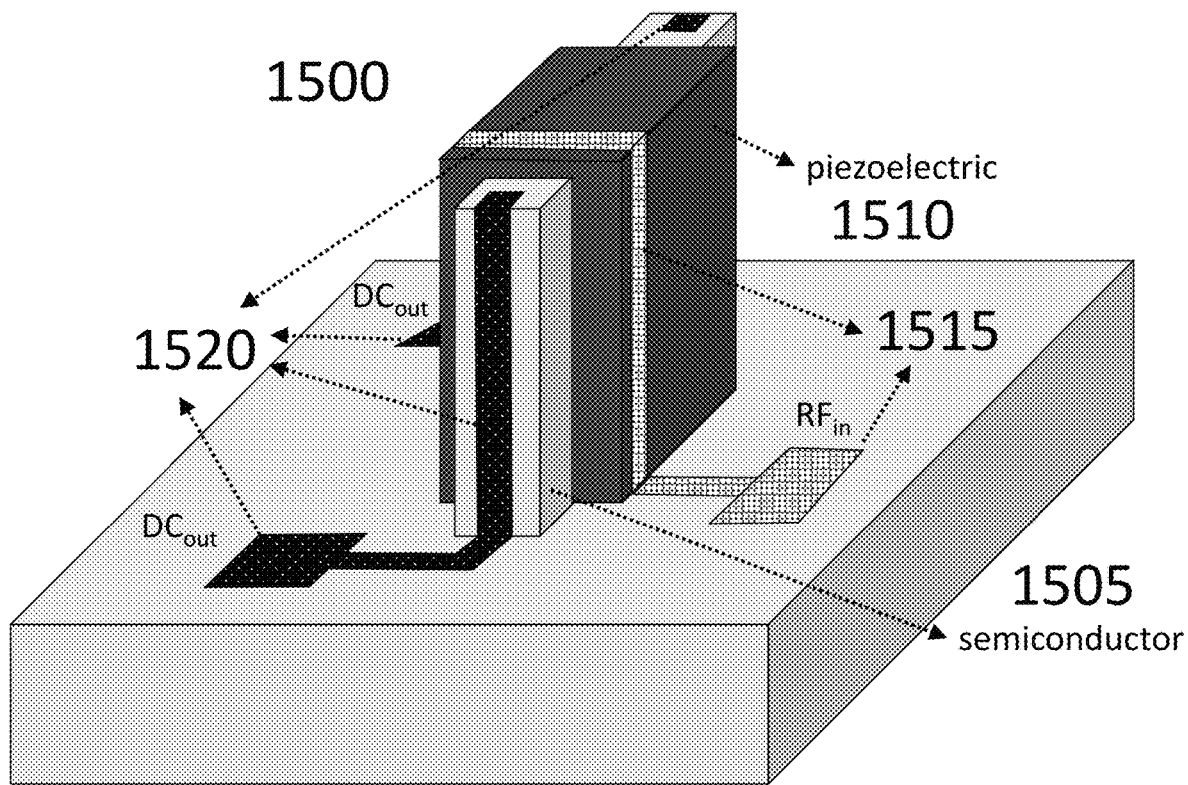
FIG. 15 illustrates a 3D view of conceptual schematic of one embodiment of acoustoelectric RF-to-DC converter in accordance with the present invention where the semiconductor layer is formed into a fin structure with its top and sidewalls covered by the piezoelectric layer.

In FIG. 15 a 3D view of a conceptual schematic of one embodiment of acoustoelectric RF-to-DC converter 1500 in accordance with the present invention is shown. The semiconductor layer is a fin-shaped structure 1505 and is covered by the piezoelectric layer 1510. In this embodiment the top and two sidewalls of the fin structure are covered by the piezoelectric layer 1510. The RF input port 1515 launches acoustic waves in the acoustoelectric RF-to-DC converter 1500. The launched acoustic waves confined within the covered fin structure interact with the charge carriers of the semiconductor layer and generate a DC signal that is measured across the output DC contacts 1520.

In various embodiments, the present invention provides a new method for RF power sensing and scavenging which takes advantage of the energy exchange mechanism between microacoustic waves and electrons. Microacoustic waves support the majority of today's RF signal processing in frontend modules. In the various embodiments, proportional to the power of the RF signal, a direct current (DC) signal is generated which can be immediately read for monitoring purposes or supplied to a subsequent stage. This RF-to-DC conversion is performed in a completely passive manner in a sub-millimeter footprint and within a frequency range (which for e.g., can be lithographically defined), therefore, allowing for its integration into ultra-low power and miniaturized wireless transceivers. The invention also reduces the reliance on batteries, which is hindering the expansion of the internet-of-things (IoT).

The invention supports many diverse applications. Wakeup receivers, especially for IoT applications, are supported whereby the passive nature of the invention allows for the use of RF signals to selectively turn on wireless nodes on demand, thereby saving the excessive amount of energy that would have been otherwise wasted in keeping the node always on, but idle. This application is crucial as limited battery life is the biggest challenge in IoT proliferation.

The invention supports power sensors, whereby the passive nature of the RF to DC conversion enables the determination of the RF power level without the need to power hungry electronics. This is achieved by the generated DC signal which is proportional in amplitude to that of the input RF and becomes important in ultra-lower power transceivers where the power budget is extremely limited.

The invention supports spectrum sensors, whereby the frequency selective nature of the RF to DC conversion allows for implementing power sensors sensitive to a predetermined frequency range by engineering the passband of the micro-acoustic waveguide. By implementing an array of power sensors, each having its own frequency, the generated output DC signals map the frequency occupancy, thus enabling spectrum sensing.

The invention supports high frequency RF transformers, whereby the RF to DC signal conversion allows for electronic isolation of the RF input signal from the output DC signal, thus eliminating the need for RF transformers that are very bulky and used for isolation.

The invention supports actuators/authenticators, whereby the incoming RF signal with the predefined signature can passively generate the DC signal needed for excitation of micro/nano scale actuators, thereby eliminating the need for an external power supply in miniaturized actuators.

The invention supports power harvesting, whereby the ambient RF power (from cellphones, Wi-Fi modules, etc.) can be passively harnessed and subsequently stored in a rechargeable battery or supercapacitor, thereby reducing/eliminating the need for battery power.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An acoustoelectric RF-to-DC converter comprising:
   an input port for receiving a radio frequency (RF) signal; and
   an acoustic waveguide coupled to the input port, the acoustic waveguide comprising a piezoelectric layer and a semiconductor layer adjacent to the piezoelectric layer, wherein the piezoelectric transduces the RF signal into an acoustic signal and the acoustic signal interacts with the semiconductor layer to generate a direct current (DC) signal that is proportional to a power of the RF signal.

2. The acoustoelectric RF-to-DC converter of claim 1, wherein the input port comprises at least one RF input port electrode and wherein a configuration of the at least one RF input port electrode determines a desired frequency range for the RF-to-DC conversion.

3. The acoustoelectric RF-to-DC converter of claim 1, wherein a periodicity of the at least one RF input port electrode determines a center frequency for the RF-to-DC conversion.

4. The acoustoelectric RF-to-DC converter of claim 1, wherein a number of fingers of the at least one RF input port electrode determines a frequency bandwidth for the RF-to-DC conversion.

5. The acoustoelectric RF-to-DC converter of claim 1, wherein an angle of a plurality of fingers of the at least one RF input port electrode determines a frequency bandwidth for the RF-to-DC conversion.

6. The acoustoelectric RF-to-DC converter of claim 1, wherein the piezoelectric layer is comprised of one or more of lithium niobate, III-V compounds such as aluminum scandium nitride, lead zirconate titanate (PZT) and lead magnesium niobate-lead titanate (PMN-PT).

7. The acoustoelectric RF-to-DC converter of claim 1, wherein the acoustic waveguide is suspended.

8. The acoustoelectric RF-to-DC converter of claim 1 wherein the acoustic waveguide is solidly mounted.

9. The acoustoelectric RF-to-DC converter of claim 1, wherein the semiconductor layer is comprised of one or more of silicon, germanium, III-V compounds and two-dimensional materials.

10. A method for converting an RF signal to a DC signal, the method comprising:
    receiving an RF signal at an input port of an acoustic waveguide, wherein the acoustic waveguide comprises a piezoelectric layer and a semiconductor layer adjacent to the piezoelectric layer;
    transducing the RF signal into an acoustic signal at the piezoelectric layer; and
    allowing the acoustic signal to interact with the semiconductor layer to generate a DC signal that is proportional to a power of the RF signal.

11. The method of claim 9, wherein the input port comprises at least one RF input port electrode and wherein a configuration of the at least one RF input port electrode determines a desired frequency range for the RF-to-DC conversion.

12. The method of claim 9, wherein a periodicity of the at least one RF input port electrode determines a center frequency for the RF-to-DC conversion.

13. The method of claim 9 wherein a number of fingers of the at least one RF input port electrode determines a frequency bandwidth for the RF-to-DC conversion.

14. The method of claim 9, wherein an angle of a plurality of fingers of the at least one RF input port electrode determines a frequency bandwidth for the RF-to-DC conversion.

15. The method of claim 9, further comprising providing the DC signal to a wireless device to wake up or power the wireless device.

16. The method of claim 9, further comprising using the DC signal to sense a frequency spectrum surrounding a wireless device.

17. The method of claim 14, wherein the wireless device is an IoT device.

18. The method of claim 9, wherein the piezoelectric layer is comprised of one or more of lithium niobate, III-V compounds such as aluminum scandium nitride, lead zirconate titanate (PZT) and lead magnesium niobate-lead titanate (PMN-PT).

19. The method of claim 9, wherein the semiconductor layer is comprised of one or more of silicon, germanium, III-V compounds and two-dimensional materials.

20. A method for performing spectrum sensing, the method comprising:
    receiving an RF signal at an input port of each acoustic waveguide of an array of acoustic waveguides, wherein each acoustic waveguide of the array of acoustic waveguides comprises a piezoelectric layer, a semiconductor layer adjacent to the piezoelectric layer and an RF input port electrode and wherein the RF input port electrode of each of the acoustic waveguides of the array of acoustic waveguides is configured to be sensitive to a different RF frequency;
    transducing the RF signal received at each of the acoustic waveguides into an acoustic signal at the piezoelectric layer of the respective acoustic waveguide;
    allowing the acoustic signal to interact with the semiconductor layer of the respective acoustic waveguide to generate a DC signal that is proportional to a power of the RF signal; and
    performing spectrum sensing based upon the DC signals generated by each of the acoustic waveguides of the array of acoustic waveguides.

* * * * *